US006158320A

United States Patent [19]

Vallance et al.

[11] Patent Number: 6,158,320

[45] Date of Patent: Dec. 12, 2000

[54] SAW ARBOR WITH SPLINED MANDREL AND MATING, TIMED INTERNALLY AND EXTERNALLY SPLINED SAW BLADE MOUNTING SLEEVE

[75] Inventors: Larry Donald Vallance, Richmond; Jim Allan Mantei, Surrey; Vittorio Dente, Burnaby, all of Canada

[73] Assignee: Vancouver Gear Works Ltd., British Columbia, Canada

[21] Appl. No.: 09/213,101

[22] Filed: Dec. 17, 1998

Related U.S. Application Data

[63] Continuation-in-part of application No. 08/714,567, Sep. 13, 1996, abandoned.

[51] Int. Cl.[7] .................................................... B23D 35/00

[52] U.S. Cl. ............................ 83/665; 83/676; 83/698.41

[58] Field of Search ............................ 83/665, 666, 676, 83/698.41, 835; 403/358, 359

[56] References Cited

U.S. PATENT DOCUMENTS

| | | | |
|---|---|---|---|
| Re. 27,126 | 5/1971 | Gingery . | |
| 2,015,430 | 9/1935 | Matthews et al. . | |
| 2,508,832 | 5/1950 | McAninch . | |
| 3,202,189 | 8/1965 | Pearson . | |
| 3,440,915 | 4/1969 | Weyant . | |
| 3,477,250 | 11/1969 | Gregorich et al. . | |
| 3,516,460 | 6/1970 | Thrasher . | |
| 3,645,304 | 2/1972 | Thrasher . | |
| 3,703,915 | 11/1972 | Pearson . | |
| 3,817,143 | 6/1974 | Jones . | |
| 3,961,548 | 6/1976 | Claassen . | |
| 4,098,096 | 7/1978 | Chard et al. . | |
| 4,153,260 | 5/1979 | Joyner | 403/359 X |
| 4,685,823 | 8/1987 | Lopez | 403/359 |
| 4,730,952 | 3/1988 | Wiley . | |
| 4,747,607 | 5/1988 | Emter . | |
| 4,827,800 | 5/1989 | Pederen et al. | 403/359 X |
| 5,022,299 | 6/1991 | Fischer et al. . | |
| 5,799,558 | 9/1998 | Hewitt et al. | 83/698.41 X |

FOREIGN PATENT DOCUMENTS

| | | |
|---|---|---|
| 5-38621 | 2/1993 | Japan . |

OTHER PUBLICATIONS

"New Arbor Design and Minimizing Saw–Arbor and Guide Clearance Profoundly Improve Circular Saw Performance", Forintek Canada Corp. Technote No. 1W, Jan. 1995.

Oberg et al, "Machinery's Handbook", 23rd Edition, Industrial Press Inc., New York, 1988, pp. 2017 and 2234.

Kirbach, "Saw Performance Critical To Lumber Quality, Yield", Wood Technology Jan./Feb. 1996, pp. 22–24.

*Primary Examiner*—M. Rachuba

*Attorney, Agent, or Firm*—Oyen Wiggs Green & Mutala

[57] ABSTRACT

A saw arbor formed of a mandrel and a cylindrically apertured sleeve. Circumferentially spaced splines are provided around the mandrel's outer circumference and around the inner circumference of the sleeve aperture. The mandrel splines and the sleeve aperture splines are shaped and sized for slidable mating engagement of the mandrel splines with the aperture splines. Circumferentially spaced splines are also provided around the sleeve's outer circumference. The sleeve outer circumference splines are shaped and sized for slidable mating engagement with further splines spaced circumferentially around a saw blade eye. Equal numbers of equally spaced involute splines are preferably provided around the mandrel, around the inner circumference of the sleeve aperture and around the sleeve's outer circumference. The splines can be formed to achieve backlash tolerance engagement in the range of 0.001" to 0.005" between the mandrel and the sleeve, and between the sleeve's outer circumference and the saw blade eye, thus providing a high precision cutting unit.

6 Claims, 11 Drawing Sheets

SAW ARBOR WITH SPLINED MANDREL AND MATING, TIMED INTERNALLY AND EXTERNALLY SPLINED SAW BLADE MOUNTING SLEEVE

REFERENCE TO RELATED APPLICATION

This is a continuation-in-part of U.S. application Ser. No. 08/714,567 filed Sep. 13, 1996 now abandoned.

FIELD OF THE INVENTION

This application pertains to a saw arbor formed by a splined mandrel slidably mated within a splined saw blade mounting sleeve. Additional splines on the sleeve's outer circumference mate within corresponding splines in a saw blade eye. This yields a balanced, precision tolerance cutting unit which minimizes wear on the saw blade, mandrel and sleeve, while improving sawing accuracy.

BACKGROUND OF THE INVENTION

U.S. Pat. No. 3,516,460 Thrasher discloses a saw arbor having a plurality of circumferentially spaced, parallel, outwardly projecting semi-cylindrical splines. A circular saw blade having a saw eye cut to match the arbor's cross-sectional shape is slidably mounted on the arbor. As the arbor is drivingly rotated, the spline's leading edges tend to make point contact with the lower forward corners of the corresponding semi-circular cutouts in the saw eye. This significantly increases wear on the eye, and can ruin the saw blade well before the saw teeth themselves wear out. The arbor's splines also wear at an increased rate, as do the bearings which support the rotating arbor. Further, the saw blade tends to flutter at high speed, resulting in a wider kerf. All of these factors contribute to an increased need for saw blade changes, which is an expensive, labour-intensive operation with attendant loss of lumber production.

Involute-splined saw arbors were developed to overcome the foregoing problems. Involute splines have substantially flat forward, rearward and top faces. Gear cutting techniques are used to maintain the arbor's splines parallel to the arbor's longitudinal axis. As a result, instead of making mere point contact with the saw blade eye, an involute-splined arbor achieves land contact across substantially the entire forward face of each spline. This significantly reduces wear, saw flutter, etc. Further, because the arbor's splines are highly parallel to the arbor's longitudinal axis, the backlash tolerance between the arbor and the saw blade eye may be reduced in order to further reduce wear, flutter, etc.

Early prior art saw arbors, such as the aforementioned Thrasher arbor, were of solid, one-piece construction, with the saw blade being mounted over splines formed in the arbor itself. Modern saw arbors, of which U.S. Pat. No. 3,645,304 Thrasher is typical, have a mandrel on which a cylindrically-apertured sleeve is slidably mounted, with the saw blade being mounted over splines formed around the sleeve's outer circumference. One or two longitudinally extending keyways are machined into the sleeve's aperture. The mandrel has a similar keyway. The keyways are aligned and a steel key is placed in the aligned keyways to position the sleeve relative to the mandrel.

Such arbors are subject to a number of problems. For example, the keyway machining process removes material from the mandrel and from the sleeve. The weight of the removed material is not precisely offset by the steel key placed in the keyway. This results in rotational imbalance, which can degrade sawing accuracy when the arbor and saw blade are driven at high rotational speeds.

A further "ovality problem" arises upon heat treatment of an arbor having a keyed mandrel and sleeve. In particular, such arbor sleeves naturally and unavoidably tend to assume an oval (i.e. out of round) cross-sectional shape following heat treating. If the arbor sleeve is out of round, then the saw blade eye cannot be formed to achieve a minimum tolerance, orientation-independent, fit on the arbor.

More particularly, the sleeve portion of a typical prior art arbor having a keyed mandrel and sleeve is commonly made by forming a series of external splines on the outer surface of a piece of cylindrical stock. The outer surface of the splined piece is then heat treated so that the splines will be able to resist wearing caused by saw eyes moving relative to the splines. A cylindrical aperture is then rough bored axially through the heat treated, splined piece and one or two longitudinally extending keyways are cut in the bored aperture, to mate with corresponding keyways formed in a mandrel. The aperture is then finish bored to correct ovality in the aperture's internal circumference which is observed after the keyways are cut.

The heat treating step creates stresses in the material of the splined piece. When keyways are cut in the splined piece these stresses give rise to the aforementioned ovality problem, causing the piece to deform so that it becomes out of round. The exact amount and/or direction of deformation is not possible to predict, and varies from sleeve to sleeve. The ovality problem affects both the internal and external circumferences of the sleeve portions of prior art arbors having a keyed mandrel and sleeve. One can correct the ovality of the sleeve's internal circumference by finish boring the sleeve aperture, as above. But, the ovality of the external circumference of the sleeve portion of a prior art arbor having a keyed mandrel and sleeve can not be eliminated without resorting to expensive grinding techniques. Prior art arbors having a keyed mandrel and sleeve, including sleeves having keyways formed in accordance with the description of "ANSI standard keys and keyseats" set forth on page 2234 of the 23rd edition of Machinery's Handbook, invariably exhibit the ovality problem.

To accommodate the ovality problem in a prior art arbor having a keyed mandrel and sleeve it is necessary to provide saw blades having eyes which fit the sleeve to relatively loose backlash tolerances. Such tolerances are typically no better than about 0.007" to 0.015". This loose tolerance allows sawmill workers to fit any saw blade on any arbor sleeve without regard to orientation of the saw eye relative to the sleeve. One could fit a saw eye more closely to an out of round sleeve by making the saw eye out of round to match the sleeve. However, the saw eye would then only fit the sleeve in one or two orientations. In some orientations, the saw eye would not fit over the sleeve because the sleeve's outer diameter at certain points would be greater than the inner diameter of the saw eye.

Saw blade eyes are conventionally formed using laser cutting techniques. After the saw eye is laser cut, the saw blade is heat treated to the desired hardness. But, the heat treating process unavoidably distorts the shape of the saw blade eye. This is another reason why saw eyes are conventionally laser cut to backlash tolerances of no better than about 0.007" to 0.015". If the saw eye were cut to a closer tolerance, then distortion introduced during the heat treating process might prevent the saw blade from fitting in any orientation on any arbor.

To illustrate the foregoing, FIG. 1A shows a prior art saw blade A mounted on a prior art arbor sleeve B before cutting of any keyway in sleeve B. If no keyways are cut in sleeve B the aforementioned ovality problem does not arise. Accordingly, as seen in FIG. 1A, saw eye splines C fit sleeve splines D with the same tolerance, regardless of the radial orientation of the saw eye relative to sleeve B. FIG. 1B shows a prior art saw blade E mounted on a prior art arbor sleeve F in which keyway G has been cut. Due to the aforementioned ovality problem, the external diameter of sleeve F measured along horizontal axis H as viewed in FIG. 1B exceeds the external diameter of sleeve F measured along vertical axis I as viewed in FIG. 1B. This effect is exaggerated in FIG. 1B, to better show that saw eye splines J fit sleeve splines K more closely in the region near horizontal axis H. Saw eye splines J do not fit sleeve splines K as closely in the region near vertical axis I.

Modern sawmills typically employ many circular saws, each of which undergo frequent saw blade changes. It is impractical to maintain a separate inventory of blades having eyes shaped to fit specific arbors in specific orientations; and/or take the time to orient a saw blade's eye to achieve minimum tolerance fit on an arbor. This is why circular saw blade eyes are formed to a loose tolerance, which may be no better than about 0.007" to 0.015", as previously explained. This loose tolerance allows the sawmill workers to fit any blade on any arbor without regard to orientation of the saw eye relative to the arbor. However, a necessary consequence is increased wear and sawing inaccuracy, as discussed above.

The present invention eliminates the aforementioned ovality problem by providing a plurality of splines formed integrally with the arbor sleeve and spaced circumferentially around the inner circumference of the sleeve's aperture. There are no keyways in the splined portions of the sleeve, so neither the internal nor the external circumferences of the splined sleeve become significantly deformed due to heat treating stresses. Therefore, it is possible to maintain much tighter tolerances between a saw blade eye and the externally splined portion of such a sleeve than is possible with a prior art arbor having a keyed mandrel and sleeve.

SUMMARY OF THE INVENTION

In accordance with the preferred embodiment, the invention provides a saw arbor formed of a keyless mandrel and a keyless, cylindrically apertured sleeve. Circumferentially spaced splines are provided around the mandrel's outer circumference and around the inner circumference of the sleeve aperture. The mandrel splines and the sleeve aperture splines are shaped and sized for slidable mating interengagement. Circumferentially spaced splines are also provided around the sleeve's outer circumference. The sleeve outer circumference splines are shaped and sized for slidable mating engagement with further splines spaced circumferentially around a saw blade eye. Because no keyways are formed in the splined portions of the mandrel or sleeve the ovality problem is eliminated. Consequently, the splines can be machined to achieve 0.001" to 0.005" backlash tolerance engagement between the mandrel and the sleeve, and between the sleeve's outer circumference and the saw blade eye, thus providing a high precision cutting unit.

Preferably, equal numbers of equally spaced involute splines are provided around the mandrel, around the inner circumference of the sleeve aperture, around the sleeve's outer circumference and around the saw eye.

DETAILED DESCRIPTION OF THE PREFERRED EMBODIMENT

Figure 1A:
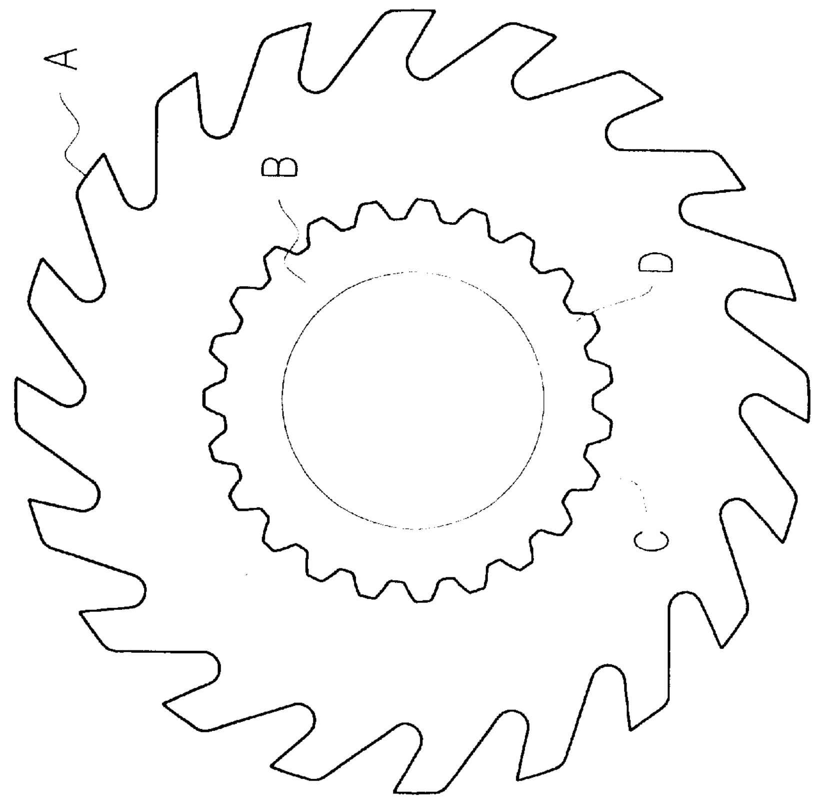
FIGURE 1A (PRIOR ART)
FIG. 1A is a side elevation view (not to scale) of a saw blade mounted on a prior art arbor sleeve before a keyway is cut in the sleeve.
Figure 1B:
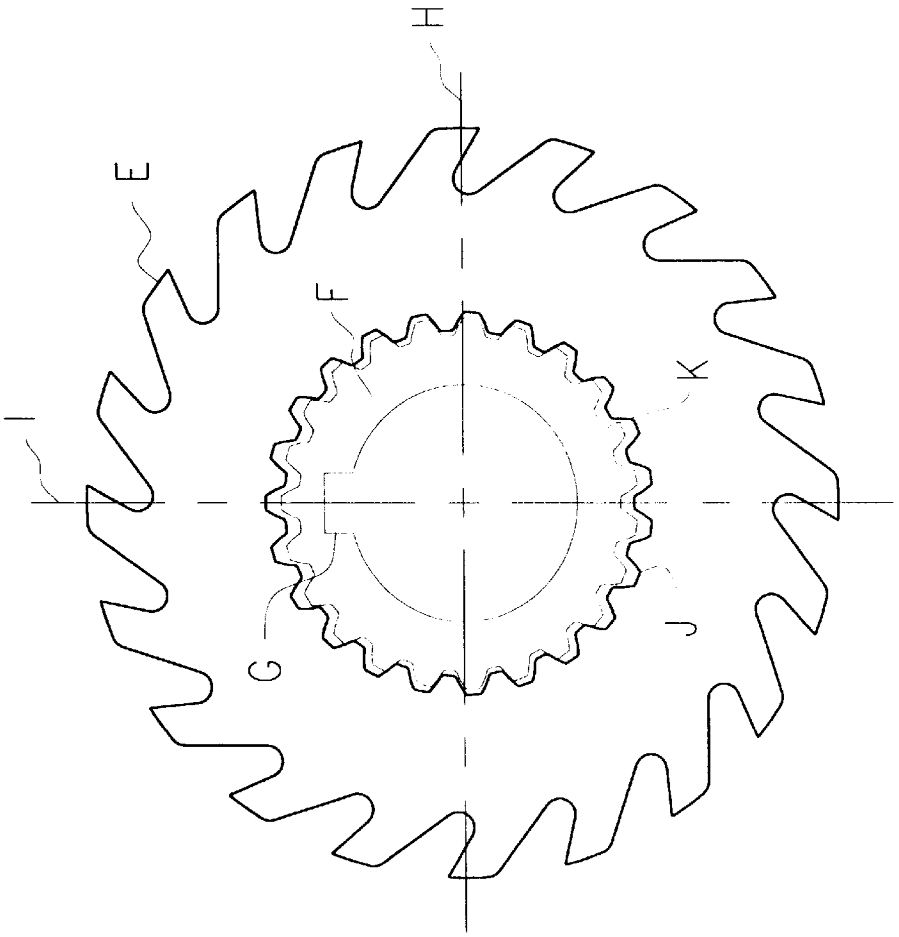
FIGURE 1B (PRIOR ART)
FIG. 1B is a side elevation view (not to scale) of a saw blade mounted on a prior art arbor sleeve in which a keyway has been cut and depicts, in an exaggerated form, the ovality problem to which such prior art keyed arbor sleeves are subject.
Figure 2A:
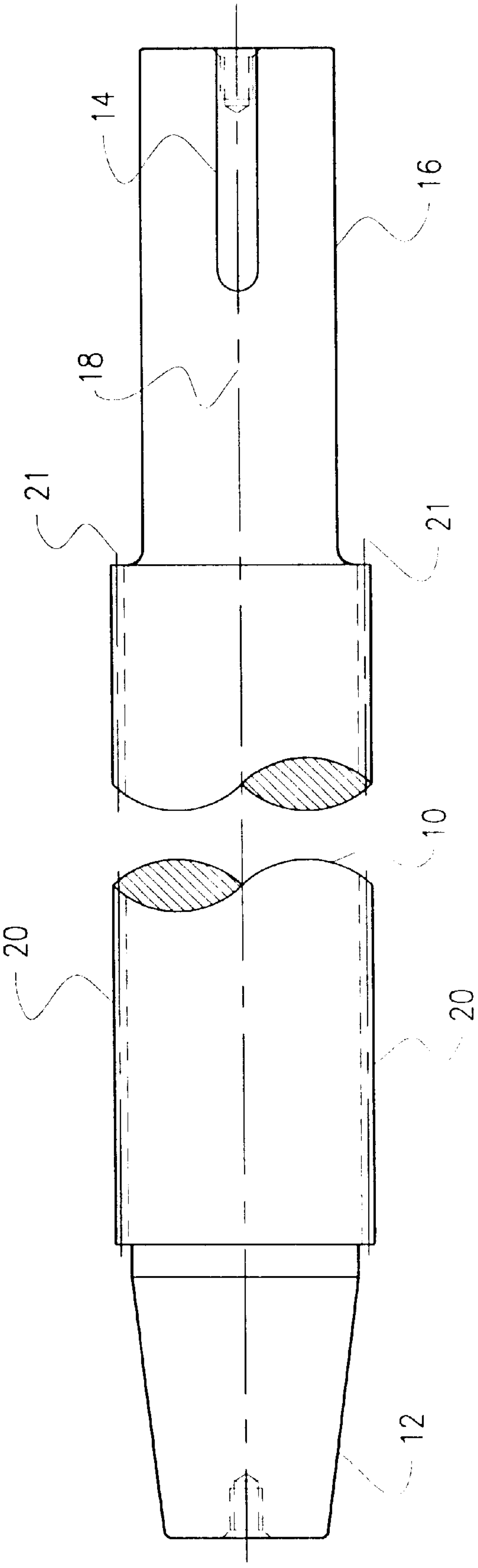
FIG. 2A is a partially fragmented front elevation view of a mandrel constructed in accordance with the preferred embodiment of the invention.
Figure 2B:
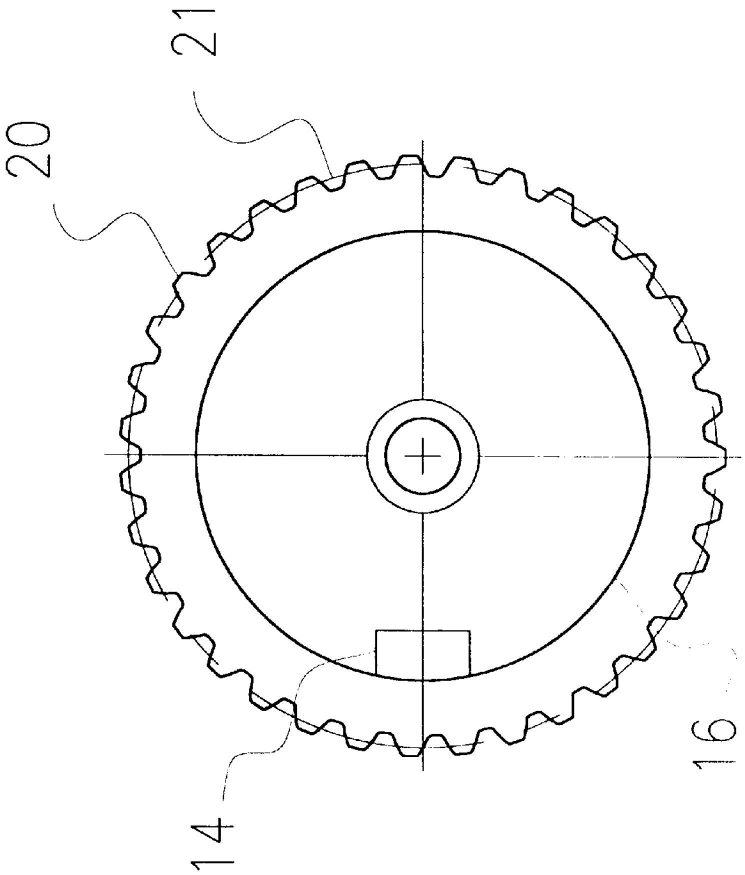
FIG. 2B is a side elevation view of the FIG. 2A mandrel.

FIGS. 2A, 2B, 5 and 6 depict a mandrel 10, one end 12 of which is tapered for mating engagement with a rotational support bearing (not shown). A keyway 14 is machined into the opposite end 16 of mandrel 10 for key-fitted engagement of mandrel 10 with a powered drive shaft (not shown) which rotationally drives mandrel 10 about its longitudinal axis 18. A first plurality of straight, parallel, outwardly projecting involute splines 20 are formed integrally with mandrel 10 and spaced circumferentially around the central, outer circumference 21 of mandrel 10. Mandrel 10 is "keyless", in the sense that no keys or keyways are provided in the portion of mandrel 10 containing splines 20.

Figure 3B:
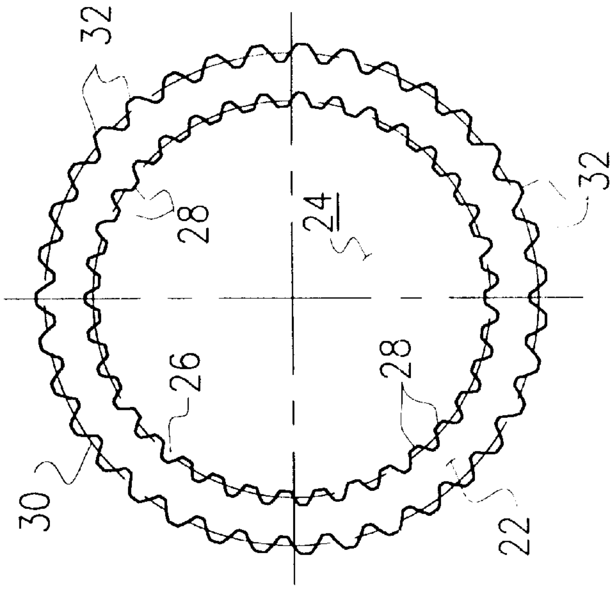
FIG. 3B is an end view of the FIG. 3A mounting sleeve.

A separate sleeve 22 (FIGS. 3A, 3B, 5 and 6) is provided. Sleeve 22 has a central, cylindrical aperture 24 having an inner circumference 26. A second plurality of straight, parallel, inwardly projecting involute "aperture" splines 28 are formed integrally with sleeve 22 and spaced circumferentially around inner circumference 26, as best seen in FIG. 3B. Sleeve 22 also has an outer circumference 30 around which a third plurality of straight, parallel, outwardly projecting involute splines 32 are formed integrally with sleeve 22 and circumferentially spaced. Sleeve 22 is "keyless", in the sense that no keys or keyways are formed in sleeve 22.

Figure 6:
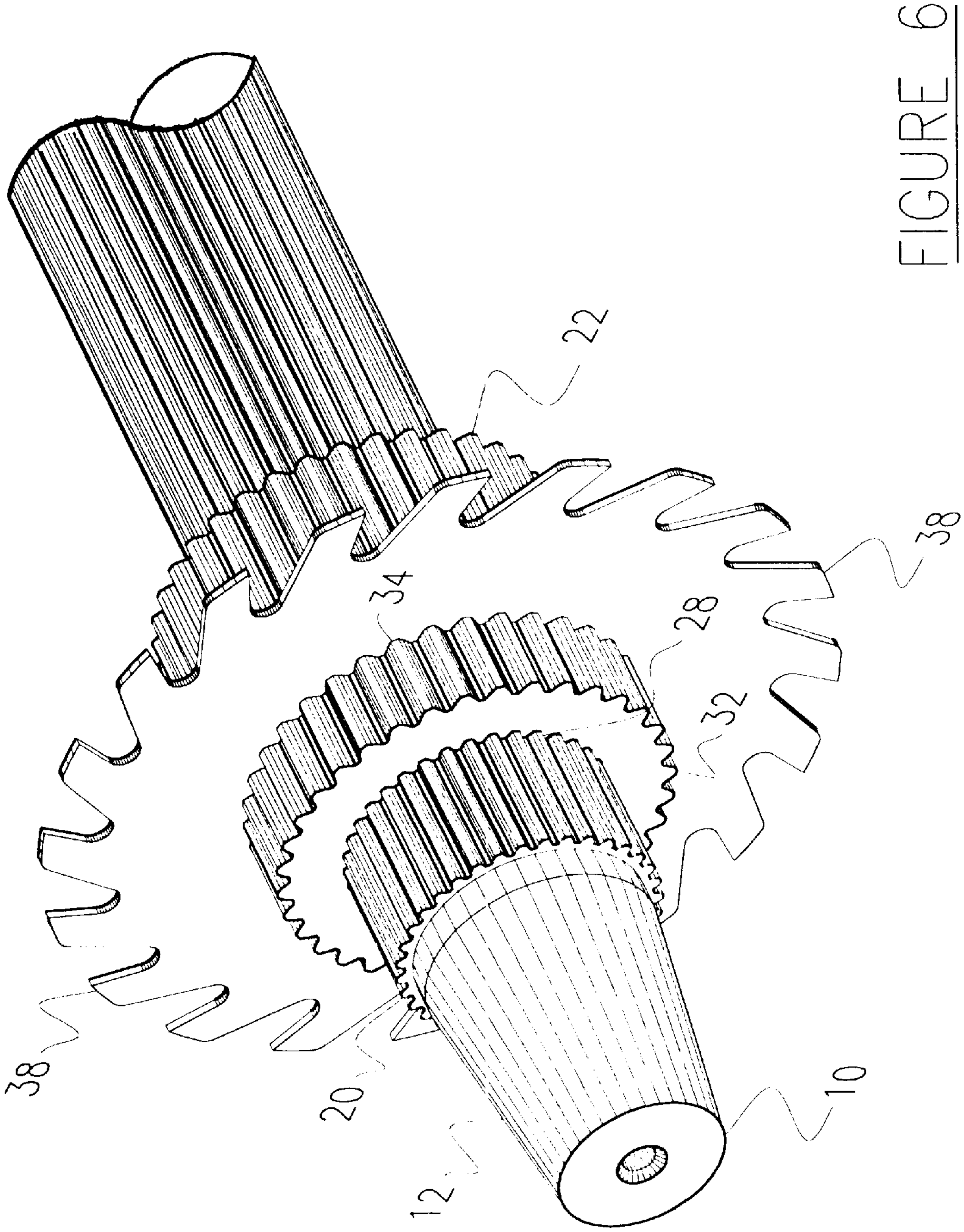
FIG. 6 is an oblique perspective illustration of an assembled saw arbor (with saw blade) according to the invention.

Mandrel splines 20 and sleeve aperture splines 28 are respectively shaped and sized for slidable, mating engagement of mandrel splines 20 within sleeve aperture splines 28 to form an arbor, as seen in FIG. 6. Outer sleeve splines 32 are respectively shaped and sized for slidable, mating engagement of splines 32 within a fourth plurality of inwardly projecting involute splines 34 spaced circumferentially around the eye 36 of a saw blade 38.

Figure 3A:
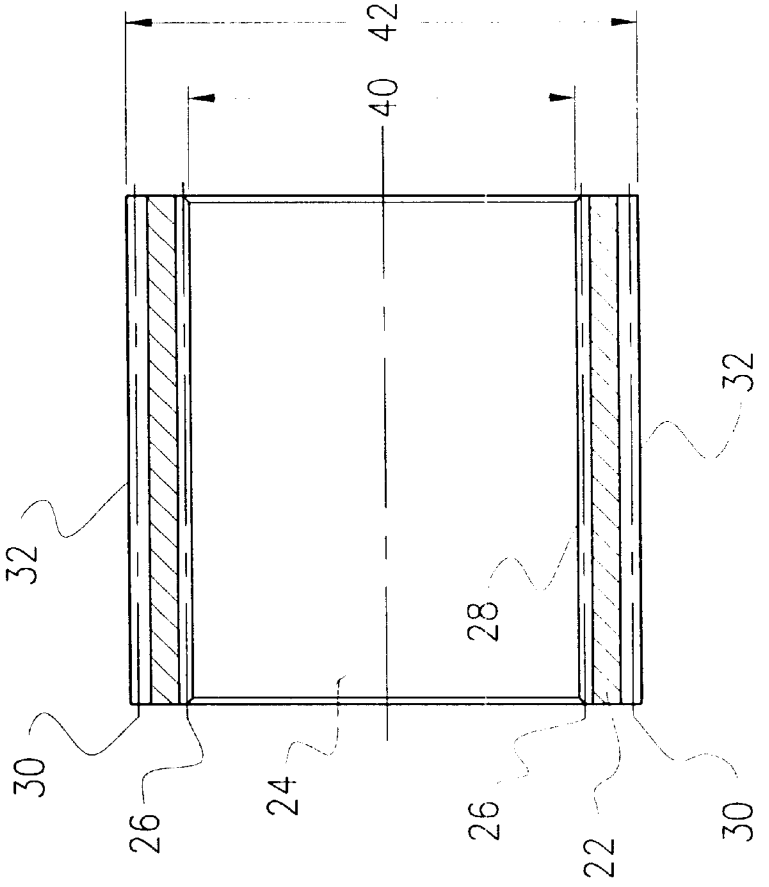
FIG. 3A is a cross-sectional front elevation of a saw blade mounting sleeve slidably engageable over the mandrel of FIGS. 2A and 2B.
Figure 4A:
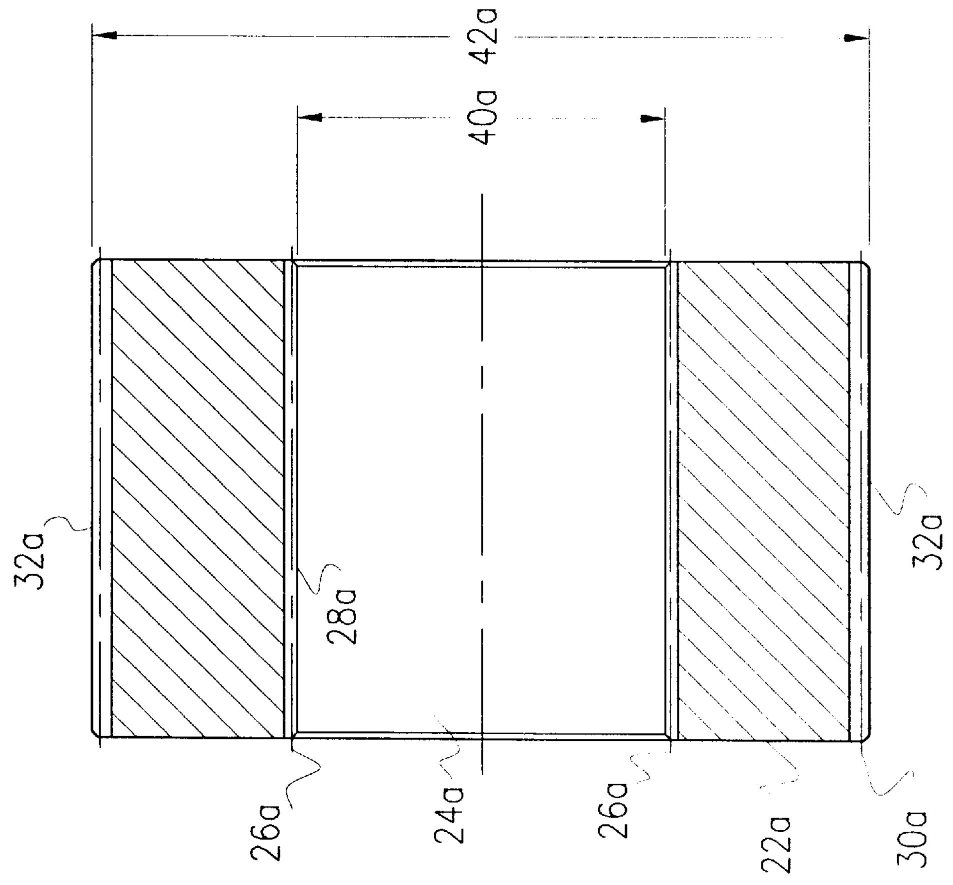
FIGS. 4A and 4B are similar to FIGS. 3A and 3B respectively, but depict a mounting sleeve having a larger outer diameter than the mounting sleeve of FIGS. 3A and 3B.
Figure 4B:
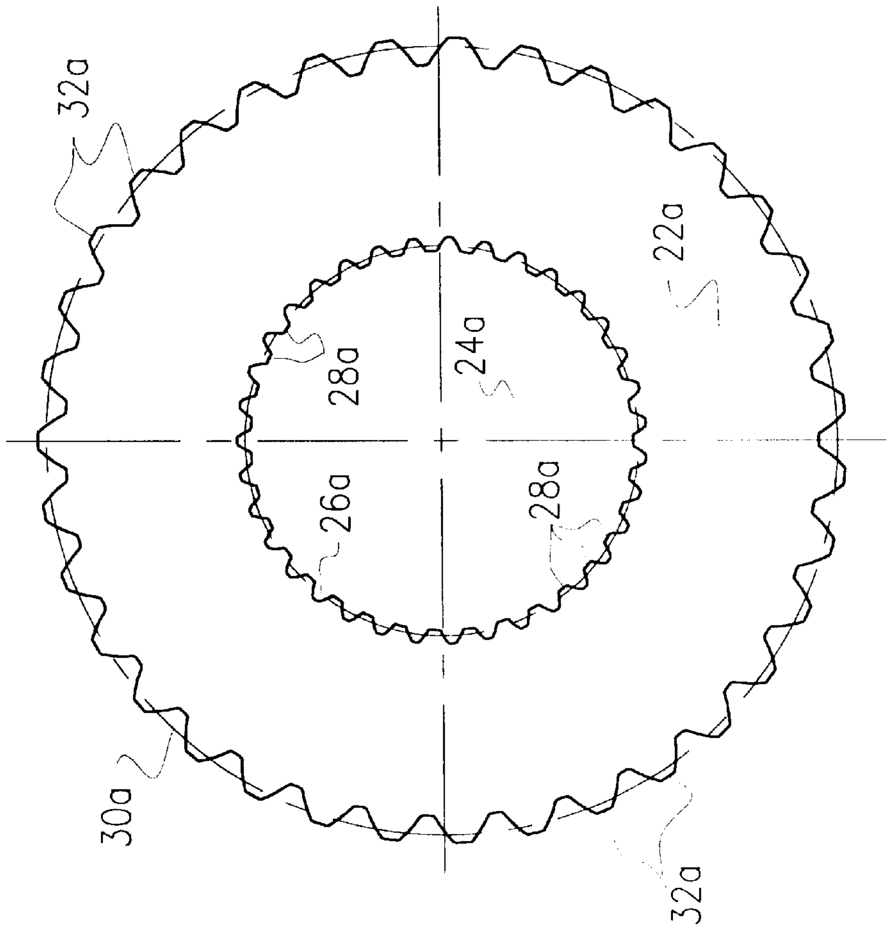
Figure 5:
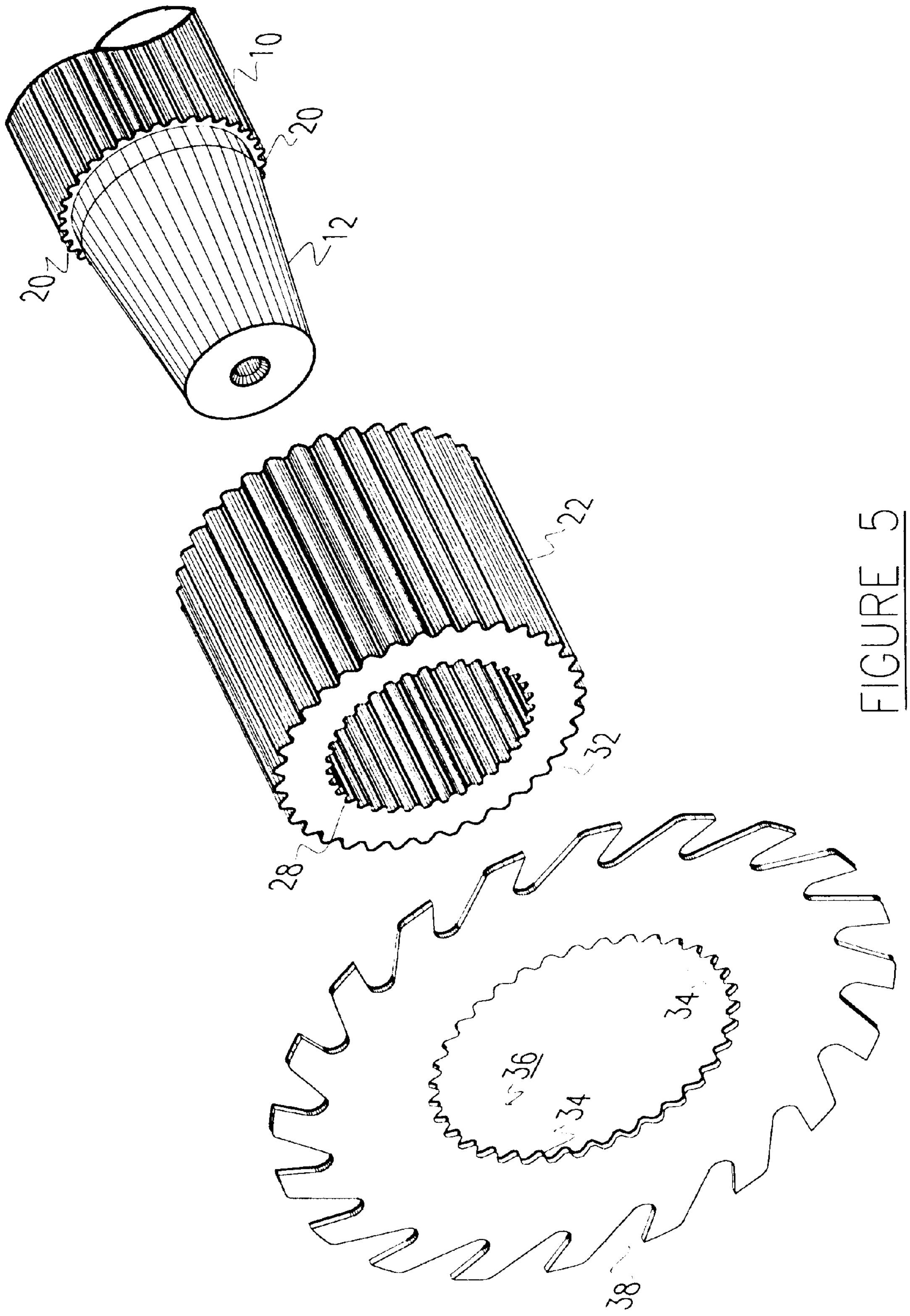
FIG. 5 is an oblique perspective illustration of a mandrel, saw blade mounting sleeve and saw blade according to the invention.

Preferably, equal numbers of splines 20, 28 and 32 are provided in each of the first, second and third pluralities aforesaid. Thus, a variety of different sleeves can be provided, one such example being depicted in FIGS. 4A and 4B in which reference numerals corresponding to those adopted in FIGS. 3A and 3B are utilized, with the addition of the suffix "a". A comparison of FIGS. 3A, 3B, 4A and 4B will reveal that sleeves 22, 22*a* have the same internal diameter 40, 40*a* but have different outer diameters 42, 42*a*. Further comparison reveals that the number of internal splines 28 on sleeve 22 equals the number of external splines 32 thereon; and, that the number of internal splines 28*a* on sleeve 22*a* equals the number of external splines 32*a* thereon. Both sleeves 22, 22*a* have equal numbers of internal splines 28, 28*a*. Thus, either one of sleeves 22, 22*a* can be slidably mounted on mandrel 10 as aforesaid.

By eliminating keyways in sleeve 22 to avoid the ovality problem, and by maintaining equal numbers of equally spaced splines 20, 28, 32, 34 on mandrel 10, sleeve 22 and saw blade 38, the invention facilitates mounting of sleeve 22 in any orientation on mandrel 10; and, mounting of saw blade 38 in any orientation on sleeve 22. It is not necessary to align any particular one of splines 20 with any particular one of splines 28 in mounting sleeve 22 on mandrel 10; nor is it necessary to align any particular one of splines 32 with any particular one of splines 34 in mounting saw blade 38 on sleeve 22. Different (or even multiple) sleeves can easily be mounted on mandrel 10. By using gear cutting techniques to produce splined mandrel 10, splined sleeve 22 and splined saw blade 38, manufacturers can carefully control precision, slidable fitting of these components to achieve a backlash tolerance in the range of 0.001" to 0.005".

The invention enables a sawmill operator to maximize the lifetime of mandrel 10, sleeve 22 and saw blade 38. A prior art sleeve containing a keyway can be mounted on a mandrel in only two 180° opposed orientations. However, sleeve-mandrel combinations manufactured in accordance with the invention can be inter-mounted in a number of orientations equal to twice the number of mandrel splines (i.e. any of splines 20 can be oriented adjacent any of splines 28; and, sleeve 22 can be mounted on mandrel 10 in either one of two 180° opposed orientations). Saw blade 38 can be mounted on sleeve 22 in a number of orientations equal to the number of splines 28 on sleeve 22.

The absence of any keyways in sleeve 22 dramatically reduces susceptibility of sleeve 22 to deformation during the heat treating process. Mandrel 10 also has much reduced susceptibility to heat treatment distortion, because end 16 of mandrel 10 containing keyway 14 is not heat treated. Only the portion of mandrel 10 bearing splines 20 is heat treated. The effect of heat treatment distortion on saw blade 38 can also be dramatically reduced by laser cutting eye 36 to an initial size smaller than the desired final size, then heat treating saw blade 38 to the desired hardness, and then using internal gear cutting techniques to form eye 36 in the desired final size, with splines 34.

Figure 7A:
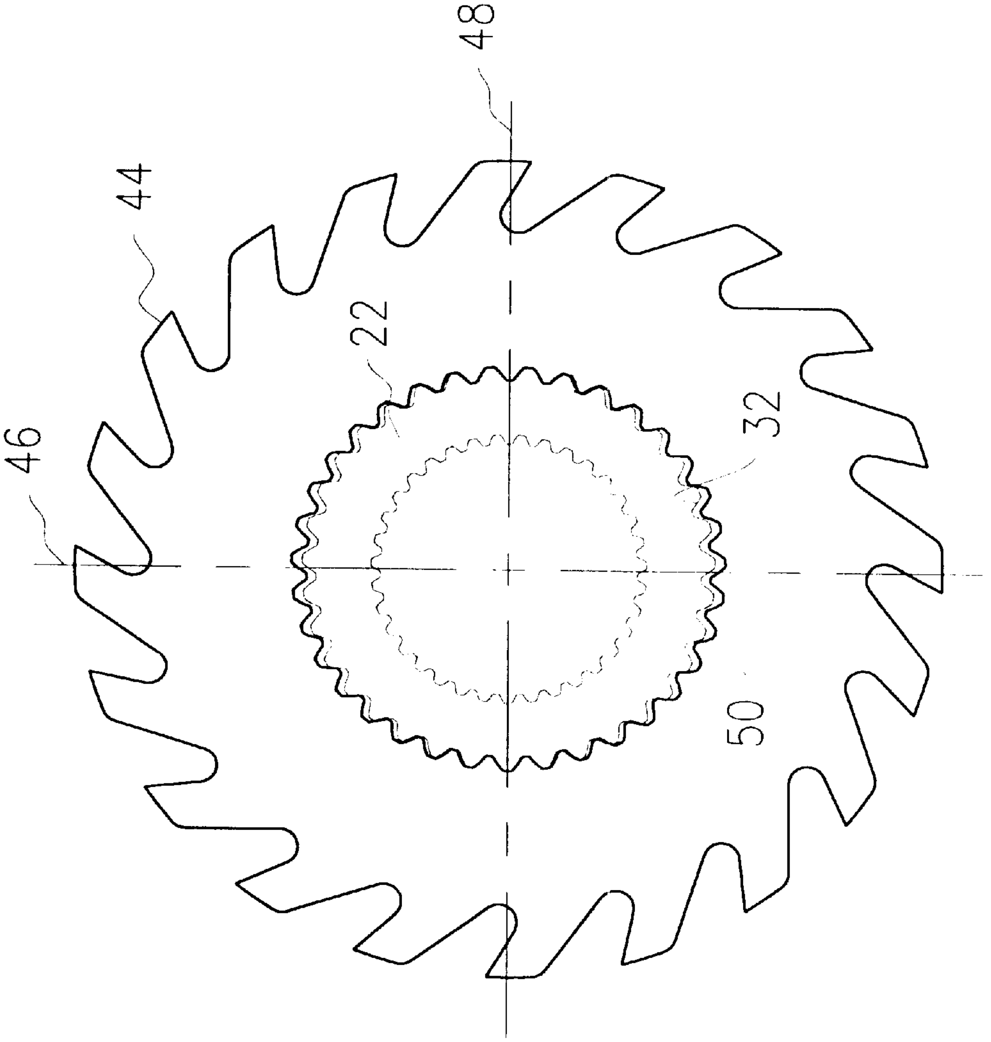
FIG. 7A is a side elevation view (not to scale) of a saw blade in which a saw eye has been formed by a prior art laser cutting process, after which the blade has been heat treated and then mounted on an arbor sleeve formed in accordance with the present invention, and depicts, in an exaggerated form, the ovality problem to which such prior art saw blades are subject.

FIG. 7A shows (not to scale) a saw blade 44 having a saw eye which has been formed by a prior art laser cutting process, heat treated to the desired hardness and then mounted on an arbor sleeve 22 formed in accordance with the present invention. The diameter of the saw eye measured along vertical axis 46 as viewed in FIG. 7A exceeds the diameter of the saw eye measured along horizontal axis 48 as viewed in FIG. 7A. This effect is exaggerated in FIG. 7A, to better show that saw eye splines 50 fit outer sleeve splines 32 more closely in the region near the aforementioned horizontal axis. Saw eye splines 50 do not fit outer sleeve splines 32 as closely in the region near the aforementioned vertical axis.

Figure 7B:
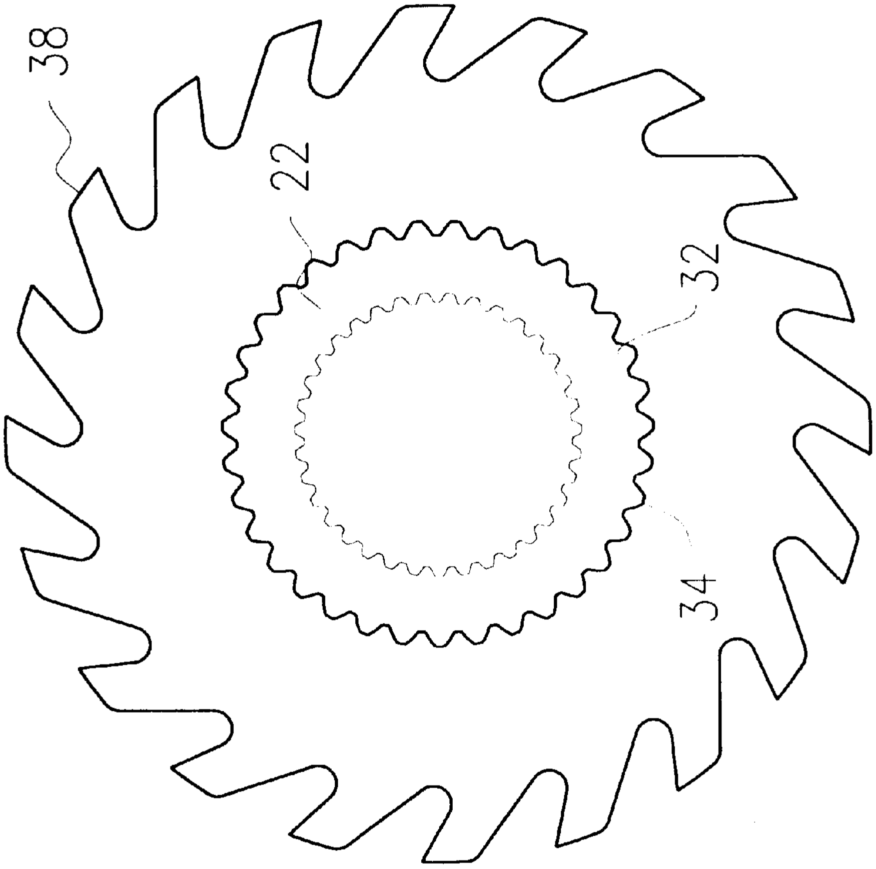
FIG. 7B is a side elevation view (not to scale) of a saw blade in which a saw eye has been formed in accordance with the present invention, after which the blade has been mounted on an arbor sleeve formed in accordance with the present invention.

FIG. 7B shows (not to scale) a saw blade 38 in which a saw eye has been formed in accordance with the present invention by using an internal gear cutting machining technique to finish forming the saw eye after saw blade 38 has been heat treated, after which saw blade 38 has been mounted on an arbor sleeve 22 formed in accordance with the present invention. As seen in FIG. 7B, machined saw eye splines 34 fit outer sleeve splines 32 with the same tolerance, regardless of the orientation of any selected diameter of the saw eye relative to any selected diameter of sleeve 22.

As will be apparent to those skilled in the art in the light of the foregoing disclosure, many alterations and modifications are possible in the practice of this invention without departing from the spirit or scope thereof. For example, although splines 20, 28, 32, 34 are preferably involute splines, they may instead be straight-sided or other shaped splines, including serrations. Involute splines are preferred because they provide the aforementioned advantages of land contact and because concentrically rotatable parts inter-mounted with involute splines are self-centering. Accordingly, the scope of the invention is to be construed in accordance with the substance defined by the following claims.

What is claimed is:

1. A saw arbor having a mandrel and a plurality of cylindrically apertured keyless sleeves, each one of said sleeves for supporting one or more saw blades, each one of said sleeves longitudinally movable along sad mandrel during non-rotation of said mandrel to selectably position said one of said sleeves in a selected position on said mandrel, each one of said saw blades longitudinally movable along said selectably positioned sleeves to selectably position each one of said saw blades in a selected sawing position on one of said sleeves for rotation of said saw blades in said respective sawing positions without longitudinal movement of said sleeves along said mandrel during driven rotation of said mandrel, said saw arbor further comprising:

(a) a keyless portion of said mandrel having a first plurality of splines formed integrally with said keyless mandrel portion and circumferentially spaced around an outer circumference of said keyless mandrel portion;

(b) each one of said sleeves having:

(i) a second plurality of aperture splines formed integrally with said one of said sleeves and spaced circumferentially around an inner circumference of said keyless aperture of said one of said sleeves to substantially inhibit ovality distortion of said keyless aperture of said one of said sleeves; and, (iii) a third plurality of heat treated splines formed integrally with said one of said sleeves and spaced circumferentially around an outer circumference of said one of said sleeves;

wherein said mandrel splines and said sleeve aperture splines are respectively shaped and sized for slidable mating engagement of said mandrel splines with said sleeve aperture splines.

2. A saw arbor as defined in claim 1, wherein said first, second and third pluralities each comprise equal numbers of splines.

3. A saw arbor as defined in claim 2, wherein:

(a) said first plurality splines are equally spaced around said outer circumference of said keyless mandrel portion;

(b) said second plurality splines are equally spaced around said inner circumference of said keyless aperture of said each one of said sleeves; and, (c) said third plurality splines are equally spaced around said outer circumference of said each one of said sleeves.

4. A saw arbor as defined in claim 3, further comprising one or more of said saw blades, each one of said saw blades having an eye, wherein said sleeve outer circumference splines are respectively shaped and sized for slidable mating engagement with a fourth plurality of splines equally, circumferentially spaced around each one of said eyes.

5. A saw arbor as defined in claim 3, wherein said splines are involute splines.

6. A saw arbor as defined in claim 4, wherein:

(a) said mandrel splines and said aperture splines are further shaped and sized to achieve backlash tolerance engagement in the range of 0.001" to 0.005" between said mandrel splines and said aperture splines; and, (b) said sleeve outer circumference splines are further shaped and sized to achieve backlash tolerance engagement in the range of 0.001" to 0.005" between said sleeve outer circumference splines and said saw blade eye splines.

* * * * *